US009753941B2

(12) United States Patent
Li et al.

(10) Patent No.: US 9,753,941 B2
(45) Date of Patent: Sep. 5, 2017

(54) STORAGE SYSTEM AND METHOD FOR PROCESSING DATA OPERATION REQUEST

(71) Applicant: Huawei Technologies Co., Ltd., Shenzhen (CN)

(72) Inventors: Sheng Li, Chengdu (CN); Yongjiang Yi, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 14/753,280

(22) Filed: Jun. 29, 2015

(65) Prior Publication Data
US 2015/0302024 A1 Oct. 22, 2015

Related U.S. Application Data

(63) Continuation of application No. PCT/CN2013/083024, filed on Sep. 5, 2013.

(51) Int. Cl.
*G06F 11/00* (2006.01)
*G06F 17/30* (2006.01)
(Continued)

(52) U.S. Cl.
CPC .... *G06F 17/30188* (2013.01); *G06F 11/0757* (2013.01); *G06F 21/725* (2013.01)

(58) Field of Classification Search
CPC ........... G06F 11/0757; G06F 17/30188; G06F 21/725
See application file for complete search history.

(56) References Cited

U.S. PATENT DOCUMENTS 8,516,022 B1 * 8/2013 Kanteti ............ G06F 17/30188
707/827
2005/0231846 A1 * 10/2005 Winarski ......... G11B 20/00086
360/69
(Continued)

FOREIGN PATENT DOCUMENTS

CN 1120778 A 4/1996
CN 1702596 A 11/2005
(Continued)

OTHER PUBLICATIONS

Partial English Translation and Abstract of Chinese Patent Application No. CN1752889A, Apr. 29, 2015, 5 pages.
(Continued)

*Primary Examiner* — Joshua P Lottich
(74) *Attorney, Agent, or Firm* — Conley Rose, P.C.

(57) ABSTRACT

A storage system and a method for processing a data operation request are disclosed. The method is applied to a storage system that has a write once read many (WORM) function. In the method, after the storage system receives a data operation request, which is used to change data stored in the storage system, sent by an application server, the storage system acquires a time difference between a real-time clock (RTC) and a reference clock, wherein the RTC is configured to provide system time for the storage system, and the reference clock cannot be modified when the system is running. Then, the storage system determines whether the time difference is greater than an accumulated time precision error of the reference clock, and refuses to execute the data operation request when the time difference is greater than the accumulated time precision error.

13 Claims, 4 Drawing Sheets

(51) Int. Cl.
*G06F 21/72* (2013.01)
*G06F 11/07* (2006.01)

(56) References Cited

U.S. PATENT DOCUMENTS

| | | | |
|---|---|---|---|
| 2005/0235095 A1* | 10/2005 | Winarski | G06F 3/0619 |
| | | | 711/4 |
| 2006/0095553 A1* | 5/2006 | Ogawa | G06F 21/725 |
| | | | 709/223 |
| 2006/0294593 A1 | 12/2006 | Eldar et al. | |
| 2007/0143462 A1 | 6/2007 | Venkatachalam et al. | |
| 2008/0155244 A1* | 6/2008 | Shih | G06F 1/14 |
| | | | 713/2 |
| 2010/0014394 A1* | 1/2010 | Fujiwara | G11B 7/00456 |
| | | | 369/47.5 |
| 2010/0086130 A1 | 4/2010 | Wang et al. | |
| 2011/0314322 A1* | 12/2011 | Shao | G06F 1/14 |
| | | | 713/400 |
| 2012/0185444 A1* | 7/2012 | Sparkes | G06F 17/30144 |
| | | | 707/689 |

FOREIGN PATENT DOCUMENTS

| | | |
|---|---|---|
| CN | 1752889 A | 3/2006 |
| CN | 101000646 A | 7/2007 |
| CN | 101194266 A | 6/2008 |
| CN | 101539972 A | 9/2009 |
| EP | 0422757 A2 | 5/1990 |
| EP | 0693854 A2 | 1/1996 |
| EP | 1647915 A1 | 4/2006 |

OTHER PUBLICATIONS

Foreign Communication From A Counterpart Application, Chinese Application No. 201380001830.X, Chinese Search Report dated Sep. 19, 2014, 6 pages.

Foreign Communication From A Counterpart Application, PCT Application No. PCT/CN2013/083024, English Translation of International Search Report dated Jul. 9, 2015, 2 pages.

Foreign Communication From A Counterpart Application, PCT Application No. PCT/CN2013/083024, Written Opinion dated Jul. 9, 2015, 6 pages.

Foreign Communication From A Counterpart Application, European Application No. 13893114.2, Extended European Search Report dated Aug. 18, 2015, 8 pages.

\* cited by examiner

STORAGE SYSTEM AND METHOD FOR PROCESSING DATA OPERATION REQUEST

CROSS-REFERENCE TO RELATED APPLICATIONS

This application is a continuation of International Application No. PCT/CN2013/083024, filed on Sep. 5, 2013, which is hereby incorporated by reference in its entirety.

TECHNICAL FIELD

The present invention relates to the field of storage technologies, and in particular, to a storage system and a method for processing a data operation request.

BACKGROUND

A modern enterprise needs to store an increasing number of important files. In order to meet a demand of the enterprise for a query of the important files and meet requirements of related storage regulations for file auditing, an increasing number of storage systems support a write once read many (WORM) function. For a file specified by a user, a storage system that supports the WORM function can set a term of protection, within which a security attribute of the file is usually set to a read-only attribute. Within the term of protection, the file can only be read but cannot be modified or deleted. The security attribute of the file can be modified or deleted according to a demand of the user only when the term of protection of the file expires. In addition, generally, the user cannot modify the set term of protection within the term of protection of the file, so as to maximally ensure security of the file.

The term of protection of the file is closely associated with a system time of the storage system. The term of protection of the file is calculated according to the system time of the storage system. If the system time of the storage system is maliciously changed, an actual term of protection of the file is changed, and the security attribute and file content of the file may be changed, which further affects the security of the file.

In the prior art, in order to ensure that a storage system has a reliable system time, a real-time clock (RTC) is usually integrated into a southbridge chip of a controller in the storage system. The RTC refers to an electronic device that can output actual time like a clock. Generally, the RTC may be an integrated circuit and therefore can also be called a clock chip. The RTC can generally be applied to a system that needs accurate time, such as a personal computer, a server, a storage system, or an embedded system. When a processor in the controller in the storage system is powered on, the processor reads time of the RTC that is integrated into the southbridge chip and uses the time of the RTC as the system time of the storage system. In the prior art, however, an intruder can easily achieve an objective of modifying the system time of the storage system by modifying the time of the RTC that is integrated into the southbridge chip, so as to achieve an objective of modifying a term of protection of a file, which affects security of the file.

SUMMARY

Embodiments of the present invention provide a method for processing a data operation request and a storage system, which can improve security of data stored in the storage system.

According to a first aspect, an embodiment of the present invention provides a storage system. The storage system is a storage system that has a WORM function, and the storage system includes a storage device and a controller. The storage device is configured to store data and the controller includes a RTC, a reference clock, and a processor. The RTC is configured to provide system time for the storage system. The reference clock is configured to verify the system time of the storage system, where the reference clock cannot be modified when the system is running. In the storage system, after the processor receives a data operation request sent by an application server, where the data operation request is used to change the data stored in the storage device, the processor acquires a time difference between the RTC and the reference clock. Then, the processor determines whether the time difference is greater than an accumulated time precision error of the reference clock, and refuses to execute the data operation request when the time difference is greater than the accumulated time precision error.

According to a second aspect, an embodiment of the present invention provides a method for processing a data operation request. The method is applied to a storage system that has a WORM function. In the method, after the storage system receives a data operation request sent by an application server, where the data operation request is used to change data stored in the storage system, the storage system acquires a time difference between a RTC and a reference clock, where the RTC is configured to provide system time for the storage system, and the reference clock cannot be modified when the system is running. Then, the storage system determines whether the time difference is greater than an accumulated time precision error of the reference clock, and refuses to execute the data operation request when the time difference is greater than the accumulated time precision error.

According to a third aspect, an embodiment of the present invention provides a non-transitory machine-readable medium configured to store computer instructions that can execute the foregoing method.

The storage system provided by the embodiment of the present invention includes a reference clock that cannot be modified in a running process of the storage system, and determines whether to execute a change operation on data stored in the storage system by comparing a time difference between a RTC and the reference clock with an accumulated time precision error of the reference clock, so as to prevent a malicious change of the data stored in the storage system caused by malicious modification of the RTC, which improves security of the stored data.

BRIEF DESCRIPTION OF DRAWINGS

To describe the technical solutions in the embodiments of the present invention more clearly, the following briefly introduces the accompanying drawings required for describing the embodiments.

DESCRIPTION OF EMBODIMENTS

To make a person skilled in the art understand the technical solutions in the present invention better, the following clearly describes the technical solutions in the embodiments of the present invention with reference to the accompanying drawings in the embodiments of the present invention. The described embodiments are merely a part rather than all of the embodiments of the present invention.

Figure 1:
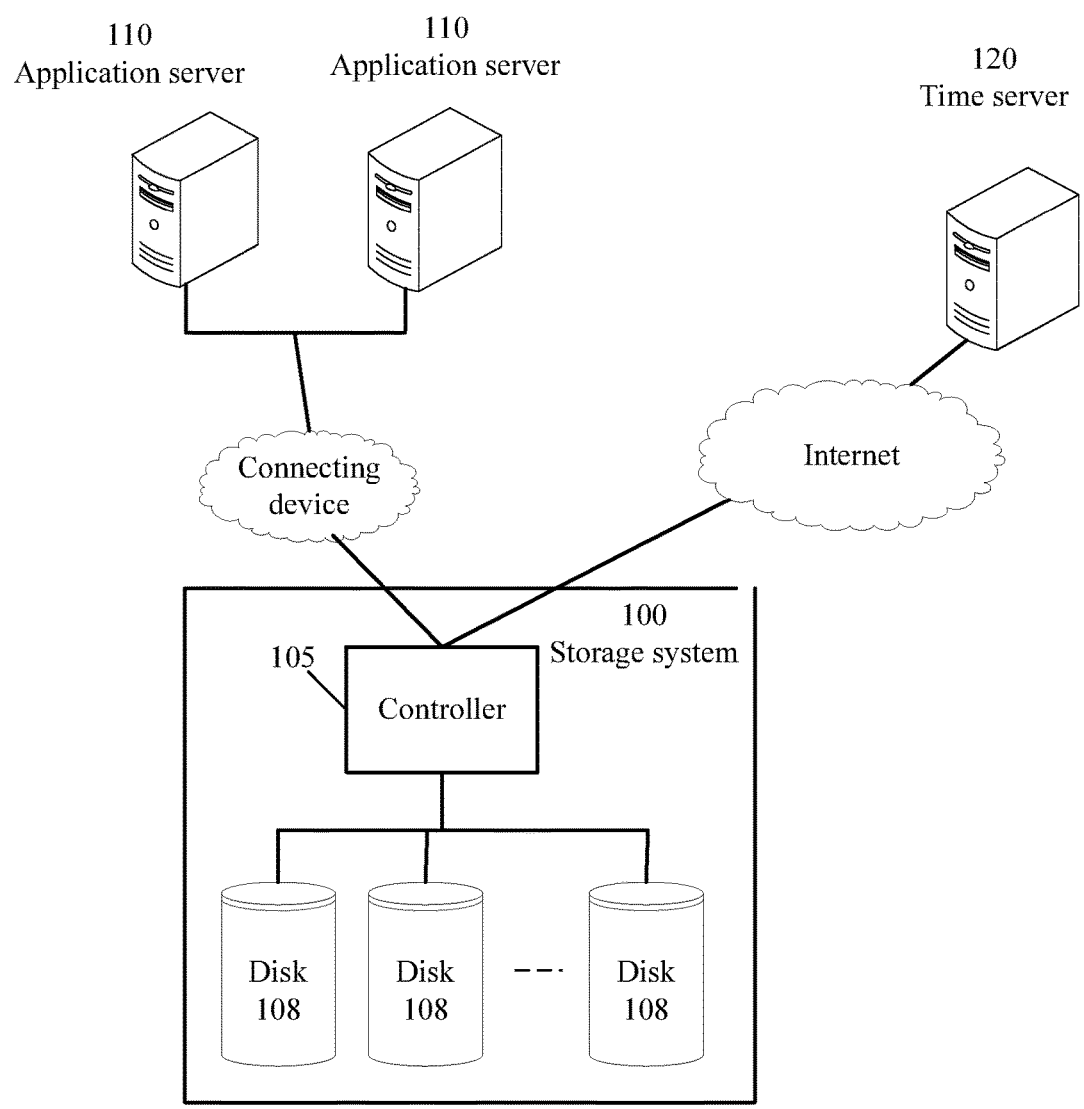
FIG. 1 is a schematic diagram of an application scenario of a storage system according to an embodiment of the present invention.

FIG. 1 is a schematic diagram of an application scenario of a storage system according to an embodiment of the present invention. As shown in FIG. 1, in the application scenario, an application server 110 communicates with a storage system 100 using a connecting device. An operating system and another application program may be installed in the application server 110. The application server 110 may send, to the storage system 100 via the connecting device, a data operation request which is used to perform an operation, such as modification or read, on data in the storage system 100. The application server 110 may include an application server such as a database server or an email server. The connecting device may include any interface, such as a fiber channel switch, an Ethernet switch, or another existing switch, which is known in the prior art and is between a storage system and an application server. According to this connecting manner, the application server 110 may communicate with the storage system 100 using a fiber channel, an Ethernet, or another communication manner. There may be multiple application servers 110.

A time server 120 is a network server. The time server 120 obtains time information from an atomic clock, a global positioning system (GPS) clock, another time server, or the like, and transfers the obtained time information to a network device, for example, the storage system 100, through a network (Internet), so as to provide an accurate, standard, secure, and reliable time service for a user.

The storage system 100 is a storage system that supports a WORM function. The storage system 100 includes a controller 105 and a disk 108. The controller 105 is configured to perform an operation on data stored in the disk 108 according to the data operation request sent by the application server 110. The disk 108 is configured to store data. It may be understood that there may be one or multiple disks 108. It should be noted that the disk 108 is merely an example of the storage device described in this embodiment of the present invention. In addition to the disk, the storage device may further include an array of independent disks (RAID), just a bunch of disks (JBOD), or one disk drive or multiple interconnected disk drives of a direct access storage device (DASD), where the direct access storage device may include a tape library, a tape storage device of one or multiple storage units, or the like. The storage device in the storage system 100 is not limited in this embodiment of the present invention.

The storage system 100 uses network time obtained from the time server 120 as a system time. In a running process of the storage system 100, the storage system 100 enables the system time of the storage system 100 to be time-synchronized with the time server 120 using a time synchronization protocol, and uses the system time as a basis for determining a term of protection of the data stored in the disk 108. The time synchronization protocol includes but is not limited to the Network Time Protocol (NTP), Simple Network Time Protocol (SNTP), and Precision Time Protocol (PTP). PTP is short for the Institute of Electrical and Electronics Engineers (IEEE) 1588 standard, and the full name of the IEEE 1588 standard is Standard for a Precision Clock Synchronization Protocol for Networked Measurement and Control Systems (IEEE 1588 Precision Clock Synchronization Protocol).

Figure 2:
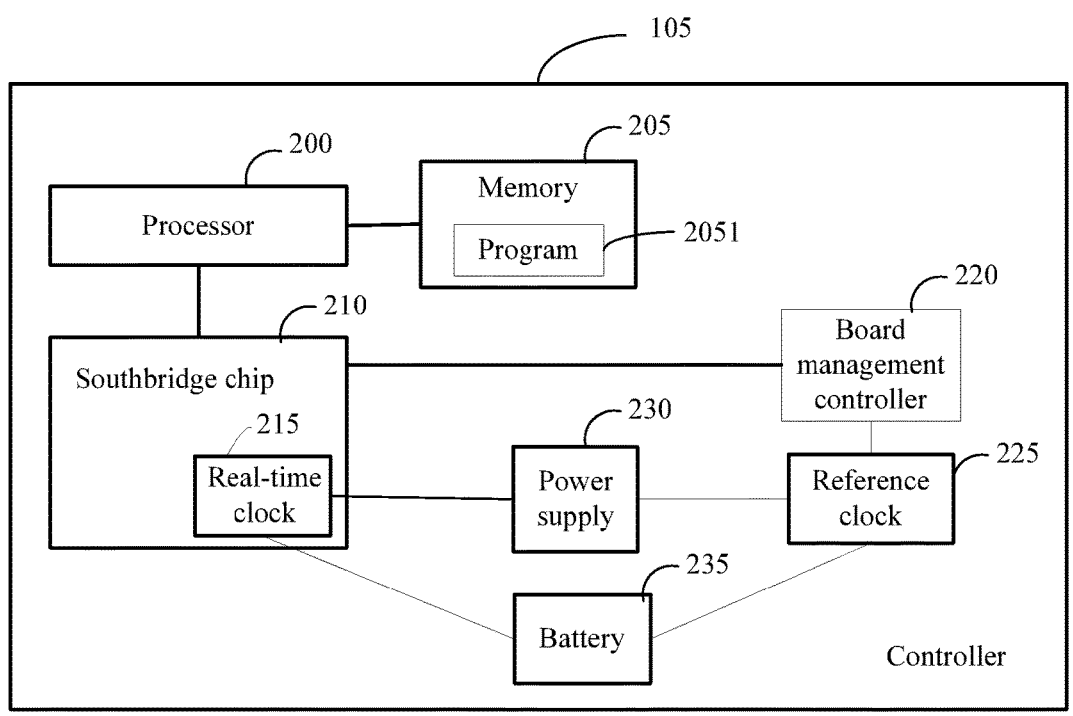
FIG. 2 is a schematic structural diagram of a controller in a storage system according to an embodiment of the present invention.

FIG. 2 is a schematic structural diagram of a controller in a storage system according to an embodiment of the present invention. As shown in FIG. 2, a controller 105 may include a processor 200, a memory 205, a southbridge chip 210, a RTC 215, a board management controller (BMC) 220, a reference clock 225, a power supply 230, and a battery 235. The processor 200 communicates with the memory 205 using a memory interface. The processor 200 communicates with the southbridge chip 210 using a communications bus, where the communications bus may include a communications bus such as a Peripheral Component Interconnect Express (PCI-E) bus or a Direct Media Interface (DMI).

The memory 205 is configured to store a program 2051. The memory 205 may include a high speed random access memory (RAM) memory, and may also include a non-volatile memory, for example, at least one magnetic disk memory. It may be understood that the memory 205 may be various non-transitory machine-readable medium that can store program code, such as a RAM, a magnetic disk, a hard disk, a compact disc, a solid state disk (SSD), or a non-volatile memory, which is not limited herein.

The program 2051 may include program code, where the program code includes a computer operation instruction.

The southbridge chip 210 is configured to be responsible for communication between the processor 200 and an external device, so as to implement control of the processor 200 over a device, such as a Peripheral Component Interconnect (PCI) interface device, a Universal Serial Bus (USB) interface device, or a RTC. In addition, the southbridge chip 210 may also be connected to the disk 108 using a serial ATA (SATA) interface. The southbridge chip includes but is not limited to an integrated southbridge chip, for example, a Platform Controller Hub (PCH).

The RTC 215 may be a RTC function circuit embedded in the southbridge chip 210, and is a clock source for a system time of the storage system. In a practical application, when the storage system 100 is initially powered on, initial time of the RTC 215 may be kept consistent with time of the time server 120 using a time synchronization protocol. For example, at a t1 moment, the processor 200 may send a synchronization packet to the time server 120 according to the NTP protocol; the synchronization packet arrives at the time server 120 at a t2 moment; the time server 120 returns a response packet of the synchronization packet to the processor 200 at a t3 moment, where the response packet carries time information about the t2 moment and the t3 moment; the response packet arrives at the processor 200 at a t4 moment. The processor 200 may calculate a value of $[(t2-t1)+(t3-t4)]/2$, and uses the calculated value as a time difference $\Delta t$ between the RTC 215 and the time server 120. The processor 200 may obtain current time T1 of the RTC 215 by reading a value of a time register of the RTC 215, and writes a value of $T1-\Delta t$ into the time register of the RTC 215 as the initial time of the RTC 215. By means of the foregoing manner, the initial time of the RTC 215 may be kept consistent with the time of the time server 120. In a running process of the storage system, the RTC 215 may be time-synchronized with the time server 120 using a time synchronization protocol, so that accurate system time can be provided for the storage system.

The RTC 215 is integrated into the southbridge chip 210, and a read and write input/output (IO) address of the RTC 215 is open to everyone. Therefore, the processor 200 may access a time register of the RTC 215 using an inb or outb instruction. For example, the processor 200 may read a value of the time register of the RTC 215 using the inb instruction to obtain the current time of the RTC 215, and uses the time of the RTC 215 as current time of the system time. The processor 200 may also change the value of the time register of the RTC 215 using the outb instruction so as to change the time of the RTC 215, thereby achieving an objective of changing time of the system time. It may be understood that the time of the RTC 215 is presented in a format of yyyy-mm-dd hh:mm:ss.

Because the processor 200 may change the value of the time register of the RTC 215 using the outb instruction and the time of the RTC 215 is generally synchronized with the time of the time server 120 in a running process of the storage system, an intruder may change the time of the RTC 215 by changing the value of the time register of the RTC 215, so as to achieve an objective of changing the system time. The intruder may also connect the storage system 100 to a false time server by modifying a network connection between the storage system 100 and the time server 120, so that the time of the RTC 215 is synchronized with time of the false time server using a time synchronization protocol, thereby achieving the objective of changing the system time. Therefore, in a running process of the storage system 100, the time of the RTC 215 may be maliciously changed.

The board management controller 220 is configured for management of a controller board, and the management includes power supply management, parameter configuration, maintenance, and the like for the controller board. The board management controller 220 may be an embedded processor. The board management controller 220 may communicate with the southbridge chip 210 using a serial port or a First In First Out (FIFO) interface.

The reference clock 225 is configured to verify the system time of the storage system. The reference clock 225 may be an independent chip that has a RTC function or an independent circuit module that has a RTC function. In this embodiment of the present invention, the reference clock 225 cannot be modified in a running process of the storage system 100. Time of the reference clock 225 is also presented in a format of yyyy-mm-dd hh:mm:ss. Time precision of the reference clock 225 is better than time precision of the RTC 215. Generally, the time precision of the reference clock 225 is several parts per million (ppm), where 1 ppm is equal to one millionth (that is, 1 ppm=$1*10^{-6}$). Generally, a time precision error of the reference clock 225 is small. For example, the time precision of the reference clock 225 is ±2 ppm. According to this manner, when the reference clock 225 runs for 1 second, an error less than 2 ppm exists. It may be understood that, in a practical application, the time precision error of the reference clock 225 may be not more than ±5 ppm because a requirement for the time precision of the reference clock 225 is relatively high. An accumulated time precision error of the reference clock 225 in the storage system may be obtained according to a set time precision error of the reference clock 225. For example, if the time precision error of the reference clock 225 is 5 ppm, with one year of 365 days as an example for calculation, a total time precision error of the reference clock 225 in the year is about $60*60*24*365*5*10^{-6}=157.68$ seconds. According to this manner, when the reference clock 225 runs for 365 days, a maximum value of an allowed error is 157.68 seconds.

The reference clock 225 is provided with an external access interface, where the external access interface may be an Inter-Integrated Circuit ($I^2C$) interface. The board management controller 220 controls the reference clock 225 using the external access interface with which the reference clock 225 is provided. For example, the board management controller 220 may read or change the value of the time register of the reference clock 225 using an $I^2C$ interface with which the reference clock 225 is provided, where the $I^2C$ interface may be a serial communications bus interface. In this embodiment of the present invention, because the reference clock 225 is not integrated into the southbridge chip 210, the processor 200 cannot access the time register of the reference clock 225 using the inb or outb instruction. The processor 200 may obtain the value of the time register of the reference clock 225 through a communication channel between the southbridge chip 210 and the board management controller 220, so as to obtain the time of the reference clock 225.

In this embodiment of the present invention, when the storage system 100 is initially powered on, an administrator may start a time management program of the reference clock 225 using a management interface of the board management controller 220, and set the initial time of the reference clock 225 to be consistent with the time of the RTC 215 using the $I^2C$ interface between the board management controller 220 and the reference clock 225. The time management program of the reference clock 225 may be stored in a program memory of the board management controller 220. After the initial time of the reference clock 225 is set, the time management program of the reference clock 225 is deleted, so that the time of the reference clock 225 cannot be changed. In this way, the reference clock 225 can provide accurate verification time for the storage system 100.

The power supply 230 is configured to supply power to the controller 105 to implement supply of power to the RTC 215 and the reference clock 225, so that the RTC 215 and the reference clock 225 can implement timing normally.

The battery 235 is configured to, when the storage system 100 becomes faulty and the power supply 230 cannot supply power, provide a power supply for the RTC 215 and the reference clock 225. The battery 235 may be a lithium-ion battery. It should be noted that the battery 235 is merely an example of a backup power device, and in a practical application, the backup power device may further include a power supply component such as a supercapacitor.

The processor 200 may be a central processing unit (CPU), or an application-specific integrated circuit (ASIC), or be configured to one or multiple integrated circuits that implement this embodiment of the present invention. In this embodiment of the present invention, the processor 200 is configured to execute a program and may execute related steps in the following method embodiments shown in FIG. 3 to FIG. 4.

Figure 3:
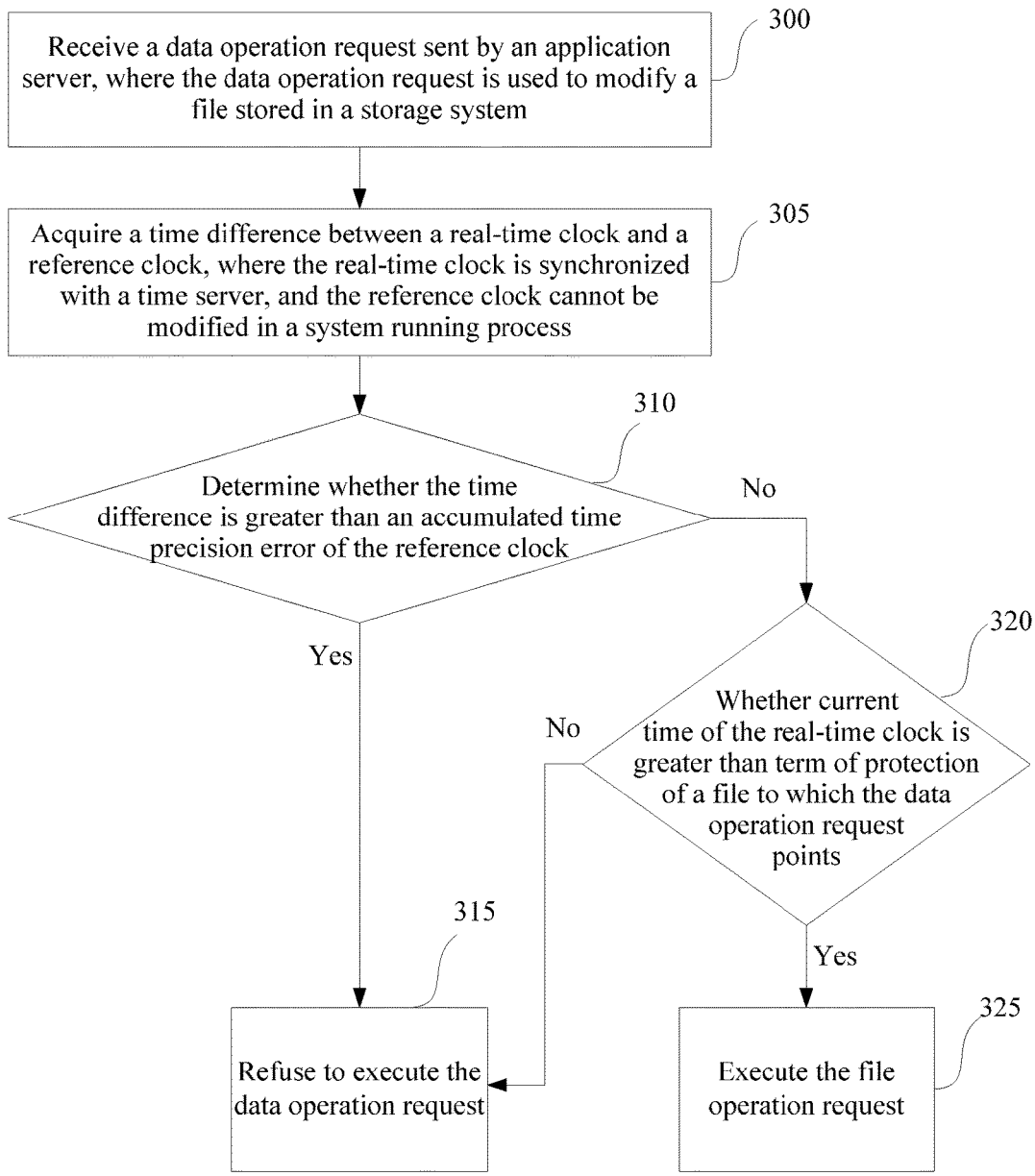
FIG. 3 is a flowchart of a method for processing a data operation request according to an embodiment of the present invention.

FIG. 3 is a flowchart of a method for processing a data operation request according to an embodiment of the present invention. The method may be applied to the storage system 100 shown in FIG. 1, where the storage system 100 is a storage system that supports a WORM function. The method may be executed by the controller 105 in the storage system 100 shown in FIG. 1 or FIG. 2 and may be executed by the processor 200 in the controller 105. The following describes the method shown in FIG. 3 with reference to FIG. 1 and FIG. 2. As shown in FIG. 3, the method may include the following steps:

In step 300, the storage system 100 receives a data operation request sent by the application server 110, where the data operation request is used to change data stored in the storage system 100. In this embodiment of the present invention, the data stored in the storage system 100 refers to data which has been written into the storage system 100 and on which only a read operation can be performed within a set term of protection. In another expression way, the data described in this embodiment of the present invention refers to data that has a read-only attribute within the set term of protection. The change of the data described in this embodiment of the present invention includes operations that exclude a read operation and can lead to a change in content of the already stored data, such as modification, deletion, and addition of the data.

In step 305, the storage system 100 acquires a time difference between the RTC 215 and the reference clock 225. The RTC 215 is synchronized with the time server 120, and time of the reference clock 225 cannot be changed in a running process of the storage system 100.

After the storage system 100 receives the data operation request sent by the application server 110, in order to determine that time of the RTC 215 has not been maliciously changed, the storage system 100 may acquire the time difference between the RTC 215 and the reference clock 225, and verifies the time of the RTC 215 using the reference clock 225. The processor 200 in the storage system 100 may acquire the time difference between the RTC 215 and the reference clock 225 by means of the process of the following method.

First, the storage system 100 reads a value of a time register of the RTC 215 to obtain the time of the RTC 215. The processor 200 may read the value of the time register of the RTC 215 using an inb instruction to obtain current time of the RTC 215. For example, the time of the RTC 215 may be 2015-01-01 23:00:00.

Second, the storage system 100 obtains time of the reference clock 225 through a communication channel between the BMC 220 and the southbridge chip 210. Because the reference clock 225 is managed by the BMC 220, the BMC 220 may read the value of the time register of the reference clock 225 using an I$^2$C interface between the reference clock 225 and the BMC 220 to obtain current time of the reference clock 225, so that the processor 200 may obtain the current time of the reference clock 225 from the BMC 220 through the communication channel between the BMC 220 and the southbridge chip 210. For example, the processor 200 initiates a request for reading the time of the reference clock 225 to the BMC 220 through the communication channel; the BMC 220 reads the value of the time register of the reference clock 225 according to the request of the processor 200 and then returns the value of the time register of the reference clock 225 to the processor 200 through the communication channel, so that the processor 200 can know the current time of the reference clock 225. The current time of the reference clock 225 may be: 2013-01-01 01:00:00.

Then, the storage system 100 obtains the time difference according to the time of the RTC 215 and the time of the reference clock 225. The processor 200 may obtain the time difference between the RTC 215 and the reference clock 225 according to a difference between the time of the RTC 215 and the time of the reference clock 225. For example, in the foregoing example, the time difference between the RTC 215 and the reference clock 225 may be: a difference between 2015-01-01 23:00:00 and 2013-01-01 01:00:00. According to this manner, the time difference between the RTC 215 and the reference clock 225 is 17542 hours.

In step 310, the storage system 100 determines whether the time difference is greater than an accumulated time precision error of the reference clock 225. In one implementation manner, the accumulated time precision error of the reference clock 225 may be preset. The accumulated time precision error of the reference clock 225 may be determined in advance according to a life cycle of the storage system 100 and a time precision error of the reference clock 225. For example, if the life cycle of the storage system 100 is 10 years and if, as in the previous example, the time precision error of the reference clock 225 is ±5 microseconds and the time precision error of the reference clock 225 running for one year is 157.68 seconds, the accumulated time precision error of the reference clock 225 is 10 years*157.68 seconds/year=1576.8 seconds.

In an alternative implementation manner, the accumulated time precision error of the reference clock 225 may also be determined according to running time of the storage system 100 and a time precision error of the reference clock 225. Initial time of the reference clock 225 when the storage system 100 is initially powered on may be recorded, and the running time of the storage system 100 is obtained by calculating a difference between the current time of the reference clock 225 when the data operation request is received and the initial time of the reference clock 225, so that the accumulated time precision error of the reference clock 225 can be obtained according to the running time of the storage system 100 and the time precision error of the reference clock 225. For example, if the storage system 100 currently has run for 5 years and the time precision error of the reference clock 225 running for one year is 157.68 seconds, the accumulated time precision error of the reference clock 225 is 5 years*157.68 seconds/year=788.4 seconds. In this embodiment of the present invention, a manner of obtaining the accumulated time precision error of the reference clock 225 is not limited.

After the time difference between the RTC 215 and the reference clock 225 is obtained, the processor 200 may compare the time difference with the accumulated time precision error of the reference clock 225 to determine whether the time difference is greater than the accumulated time precision error of the reference clock 225. For example, if, as in the foregoing example, the time difference between the RTC 215 and the reference clock 225 is 17542 hours and the accumulated time precision error of the reference clock 225 is 1576.8 seconds, the time difference between the RTC 215 and the reference clock 225 is greater than the accumulated time precision error of the reference clock 225. If the time difference is greater than the accumulated time precision error of the reference clock 225, the method goes to step 315. If the time difference is not greater than the accumulated time precision error of the reference clock 225, the method goes to step 320.

In step 315, the storage system 100 refuses to execute the data operation request. As described in the foregoing, in a running process of the storage system 100, the RTC 215 may be maliciously modified, but the reference clock 225 cannot be modified, and the reference clock 225 is not synchronized with the time server 120 in the running process of the storage system 100. Therefore, there is no possibility that the time of the reference clock 225 is maliciously changed, and the time of the reference clock 225 is more reliable than the time of the RTC 215. In this embodiment of the present invention, if, in step 310, the processor 200 determines that the time difference between the RTC 215 and the reference clock 225 is greater than the accumulated time precision error of the reference clock 225, it indicates that the RTC 215 has already been maliciously modified. To protect security of the data stored in the storage system 100, the storage system 100 may refuse to execute the data operation request and refuse to change, according to the received data operation request, the data stored in the storage system 100.

It may be understood that, if the time difference between the RTC 215 and the reference clock 225 is greater than the accumulated time precision error of the reference clock 225, the storage system 100, in addition to refusing to execute the data operation request, may further send an alarm and synchronize the time of the RTC 215 with the time of the reference clock 225, so as to achieve an objective of correcting a system time of the storage system 100.

In step 320, the storage system 100 determines whether the current time of the RTC 215 is greater than a term of protection of data to which the data operation request points. For example, in order to meet a requirement of a data storage regulation, the term of protection of data to be changed according to the data operation request ends at 2015-01-01 00:00:00, that is, the data can be modified or deleted only after 2015-01-01 00:00:00. If, in step 310, the storage system 100 determines that the time difference between the RTC 215 and the reference clock 225 is not greater than the accumulated time precision error of the reference clock 225, the storage system 100 needs to further determine whether the current time of RTC 215 is greater than the term of protection of the data to which the data operation request points. If the current time of the RTC 215 is not greater than the term of protection of the data to which the data operation request points, it indicates that the data to which the data operation request points is within the term of protection and that a modification or deletion operation cannot be performed on the data, and the method goes to step 315 in which the storage system 100 refuses to execute the data operation request. If the current time of the RTC 215 is greater than the term of protection of the data to which the data operation request points, it indicates that the data to which the data operation request points is out of the term of protection, and a change operation such as modification or deletion can be performed on the data.

For example, if the current time of the RTC 215 is 2013-01-01 00:00:00 and the term of protection of the data to be changed according to the data operation request ends at 2015-01-01 00:00:00, it indicates that the data is within the term of protection, and the method goes to step 315 in which the storage system 100 refuses to execute the data operation request. If the current time of the RTC 215 is 2013-01-01 00:00:00 and the term of protection of the data to be changed according to the data operation request ends at 2012-01-01 00:00:00, it indicates that the data is out of the term of protection, and the method goes to step 325.

In step 325, the storage system 100 executes the data operation request. For example, the storage system 100 may perform, according to the data operation request, a change operation that can change content of the already stored data, such as deletion or modification of the stored data.

In the method for processing a data operation request described in this embodiment of the present invention, when the storage system 100 receives the data operation request sent by the application server 110, the storage system 100 verifies the time of the RTC 215 according to the time of the reference clock 225 and, if the time difference between the RTC 215 and the reference clock 225 is greater than the accumulated time precision error of the reference clock 225, refuses to execute the data operation request. The reference clock 225 cannot be modified in the running process of the storage system 100; therefore, the time of the reference clock 225 is more accurate than the time of the RTC 215. In this embodiment of the present invention, whether to execute the change operation on the data is determined by comparing the time difference between the RTC 215 and the reference clock 225 with the accumulated time precision error of the reference clock 225, so as to prevent a malicious change of the data stored in the storage system 100 caused by malicious modification of the RTC 215, thereby improving security of the stored data.

Figure 4:
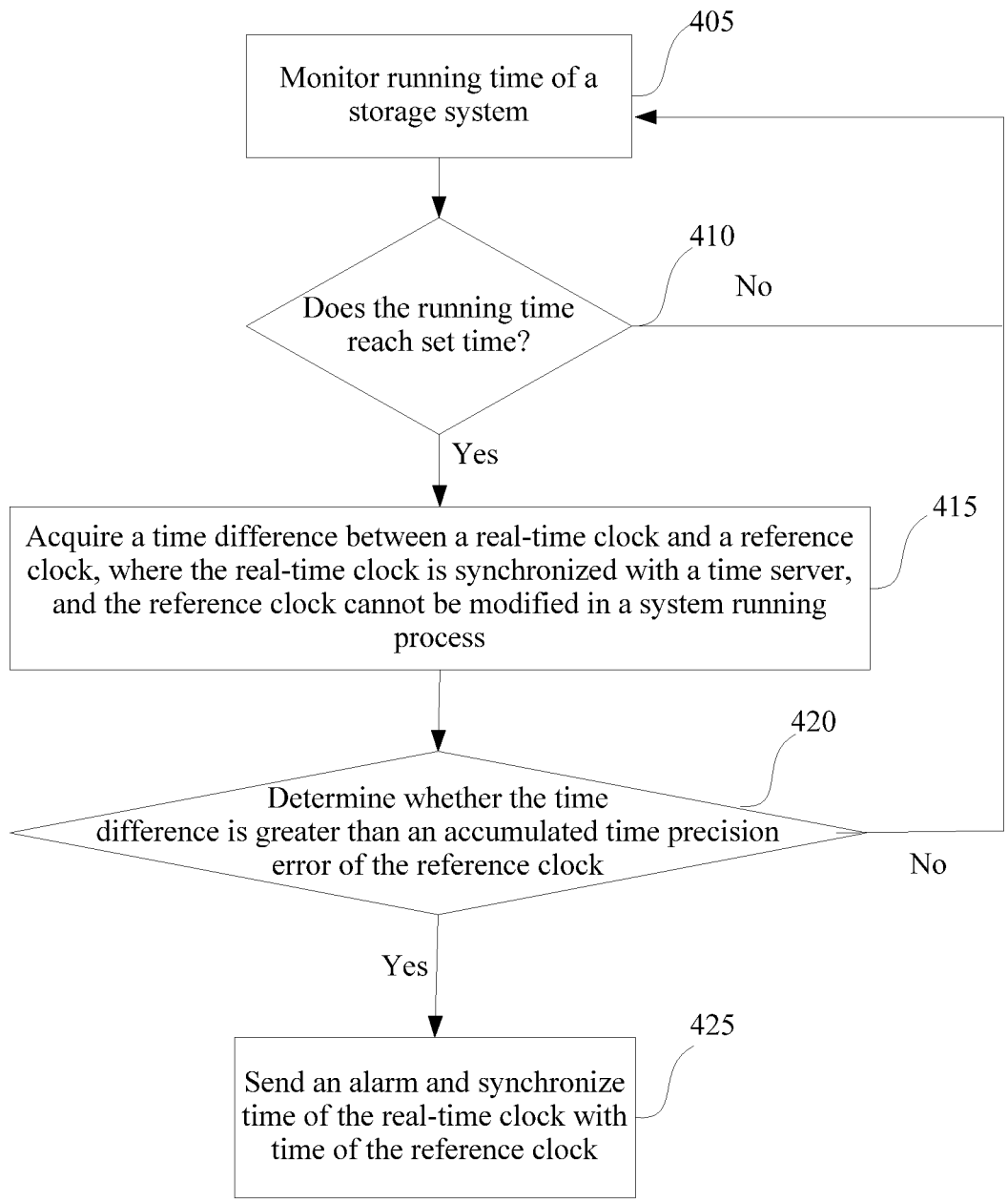
FIG. 4 is a flowchart of a system time maintenance method for a storage system according to an embodiment of the present invention.

To ensure that the storage system 100 has a more reliable system time, an embodiment of the present invention further provides a system time maintenance method of the storage system 100, where the method may still be executed by the controller 105 in the storage system 100 shown in FIG. 1 or FIG. 2. The following describes the method in FIG. 4 with reference to FIG. 1 and FIG. 2. As shown in FIG. 4, the method includes the following steps:

In step 405, the controller 105 monitors running time of the storage system 100. The monitoring running time of the storage system 100 may start when the storage system 100 is initially powered on, where initial time of the system time of the storage system 100 is initial time of the RTC 215, and the initial time of the RTC 215 is time synchronized from the time server 120 when the storage system 100 is initially powered on. In another expression way, the initial time of the system time of the storage system 100 is the same as the time, of the time server 120, at which the storage system 100 is initially powered on. A person skilled in the art may know that in a running process of the storage system 100, the RTC 215 is synchronized with the time server 120.

In step 410, the controller 105 may determine whether the running time of the storage system 100 reaches set time. It may be understood that a fixed time period, for example, 1 month or 6 months, may be set. Certainly, the set time may also not be a fixed time period, for example, the storage system 100 may be set to run until yyyy-mm-dd. The set time is not limited herein. If the running time reaches the set time, the method goes to step 415; if the running time does not reach the set time, the method goes back to step 405 to continue monitoring the running time of the storage system 100.

In step 415, the controller 105 acquires a time difference between the RTC 215 and the reference clock 225, where the RTC 215 is synchronized with the time server 120, and the reference clock 225 cannot be modified when the system is running. Step 415 is similar to step 305 in FIG. 3; for details, reference may be made to the foregoing descriptions of step 305 in FIG. 3.

In step 420, the controller 105 determines whether the time difference is greater than an accumulated time precision error of the reference clock 225. If the time difference is greater than the accumulated time precision error of the reference clock 225, the method goes to step 425; if the time difference is not greater than the accumulated time precision error of the reference clock 225, the method goes back to step 405 to continue monitoring the running time of the storage system 100. Step 420 is similar to step 310 in FIG. 3; for details, reference may be made to the foregoing descriptions of step 310 in FIG. 3.

In step 425, the controller 105 sends an alarm and synchronizes time of the RTC 215 with time of the reference clock 225. Because time precision of the reference clock 225 is generally better than time precision of the RTC 215 and the reference clock 225 cannot be modified in the system running process, the time of the reference clock 225 is more accurate. To provide more accurate system time for the storage system 100, when the running time of the storage system 100 reaches the set time, the storage system 100 may use the reference clock 225 to calibrate the RTC 215.

According to the system time maintenance method shown in FIG. 4, the system time of the storage system 100 provided by the foregoing embodiment of the present invention is not only synchronized with the time server 120, but also uses the reference clock 225 to calibrate the RTC 215, so that the storage system 100 has more accurate system time.

In this embodiment of the present invention, specific forms of the reference clock and the system time are not limited. In another case, for example, in a case in which the storage system 100 includes multiple embedded CPUs, RTCs may also be added for the multiple embedded CPUs. In this way, one storage system may have multiple RTCs. In this case, in a first manner, one RTC may be determined, by means of election, as a clock source for the system time of the storage system. When a data operation request is processed or the system time needs to be calibrated, time of the multiple RTCs may be compared, and if time of more than half of the RTCs is the same, the time of the more than half of the RTCs is used as time of the reference clock. In a second manner, time of the multiple RTCs in the storage system may also be compared, and if time of more than half clocks among the multiple RTCs is the same, the time of the more than half of the RTCs is used as the system time of the storage system, so as to provide reliable and accurate system time for the storage system.

It may be understood that the embodiments of the present invention are also applicable to a storage system that includes a file system. In another expression way, the data described in the embodiments of the present invention may also be stored in the storage system in a file form. The method described in the embodiments of the present invention is applicable to an operation no matter whether the operation is on a data block in the storage system or on a file in the storage system.

It should be noted that the embodiments provided by the present application are merely exemplary. A person skilled in the art may clearly know that, for convenience and conciseness of description, in the foregoing embodiments, the description of each embodiment has respective focuses. For a part that is not described in detail in an embodiment, reference may be made to related descriptions in other embodiments. Features disclosed in the embodiments of the present invention, claims, and accompanying drawings may exist independently, or exist in a combination. Features described in a hardware form in the embodiments of the present invention may be executed by software, and vice versa, which is not limited herein.

What is claimed is:

1. A storage system, wherein the storage system is a storage system that has a write once read many (WORM) function, and comprises:
    a storage device configured to store data; and
    a controller, comprising:
        a real-time clock (RTC) configured to provide system time for the storage system;
        a reference clock configured to verify the system time of the storage system and provided with an external access interface, wherein the reference clock is controlled by a board management controller (BMC) through the external access interface with which the reference clock is provided, and wherein the reference clock cannot be modified when the storage system is running;
        the BMC configured to read a value of a time register of the reference clock to obtain time of the reference clock; and
        a processor configured to:
            receive a data operation request sent by an application server, wherein the data operation request is used to change the data stored in the storage device;
            read a value of a time register of the RTC to obtain time of the RTC;
            obtain the time of the reference clock through a communication channel between the BMC and a southbridge chip;
            acquire a time difference between the RTC and the reference clock based on the time of the RTC and the time of the reference clock;
            determine whether the time difference is greater than an accumulated time precision error of the reference clock; and
            refuse to execute the data operation request when the time difference is greater than the accumulated time precision error.

2. The storage system according to claim 1, wherein the processor is further configured to:
    determine whether current time of the RTC is greater than protection time of data to which the data operation request points when the time difference is not greater than the accumulated time precision error; and
    execute the data operation request when the current time of the RTC is greater than the protection time.

3. The storage system according to claim 2, wherein the processor is further configured to refuse to execute the data operation request when the current time of the RTC is not greater than the protection time.

4. The storage system according to claim 1, wherein the processor is further configured to:
    determine, according to a set time interval, whether the time difference is greater than the accumulated time precision error of the reference clock; and
    synchronize the time of the RTC with the time of the reference clock when the time difference is greater than the accumulated time precision error.

5. The storage system according to claim 1, wherein the processor is further configured to determine the accumulated time precision error of the reference clock according to a life cycle of the storage system and a time precision error of the reference clock.

6. The storage system according to claim 1, wherein the processor is further configured to determine the accumulated time precision error of the reference clock according to running time of the storage system and a time precision error of the reference clock.

7. The storage system according to claim 1, further comprising a backup power device configured to provide a power supply for the RTC and the reference clock when the storage system is powered off.

8. A method for processing a data operation request, wherein the method is applied to a storage system that has a write once read many (WORM) function, the method comprising:
    receiving a data operation request sent by an application server, wherein the data operation request is used to change data stored in the storage system;
    read a value of a time register of a real-time clock (RTC) to obtain time of the RTC, wherein the RTC is configured to provide system time for the storage system;

obtain the time of a reference clock through a communication channel between a board management controller (BMC) and a southbridge chip, wherein the reference clock is configured to verify the system time of the storage system and provided with an external access interface, wherein the reference clock is controlled by a board management controller, BMC, through the external access interface with which the reference clock is provided, and wherein the reference clock cannot be modified when the storage system is running;

acquiring a time difference between the RTC and the reference clock based on the time of the RTC and the time of the reference clock;

determining whether the time difference is greater than an accumulated time precision error of the reference clock; and refusing to execute the data operation request when the time difference is greater than the accumulated time precision error.

9. The method according to claim 8 further comprising:
determining whether current time of the RTC is greater than protection time of data to which the data operation request points when the time difference is not greater than the accumulated time precision error; and executing the data operation request when the current time of the RTC is greater than the protection time.

10. The method according to claim 9, further comprising refusing to execute the data operation request when the current time of the RTC is not greater than the protection time.

11. The method according to claim 8, further comprising:
determining, according to a set time interval, whether the time difference is greater than the accumulated time precision error of the reference clock; and
synchronizing the time of the RTC with the time of the reference clock when the time difference is greater than the accumulated time precision error.

12. The method according to claim 8, further comprising determining the accumulated time precision error of the reference clock according to a life cycle of the storage system and a time precision of the reference clock.

13. The method according to claim 8, further comprising determining the accumulated time precision error of the reference clock according to running time of the storage system and a time precision error of the reference clock.

* * * * *